March 20, 1945.     S. KRASNOW     2,371,628
METHOD AND APPARATUS FOR DYNAMIC MEASUREMENT OF BOREHOLE RADIOACTIVITY
Filed Dec. 31, 1940     3 Sheets-Sheet 1
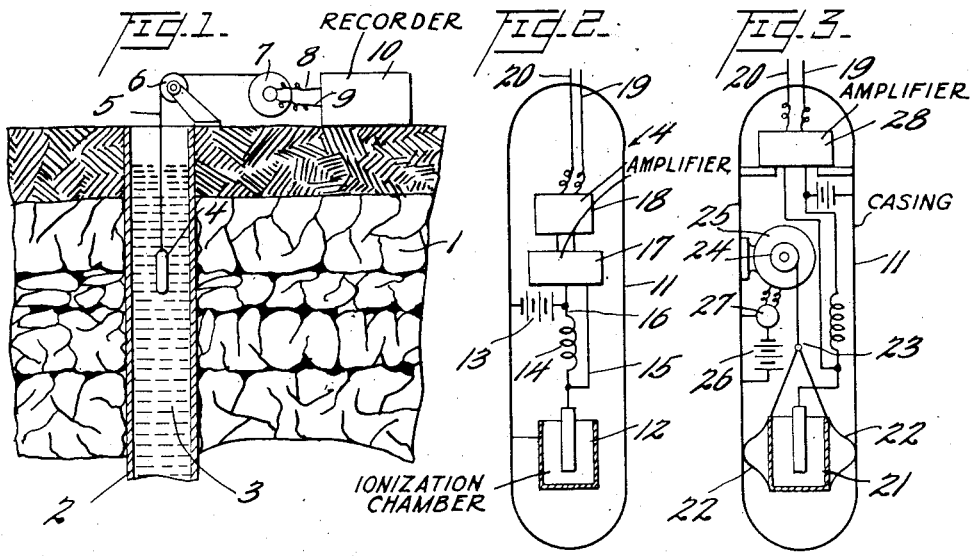
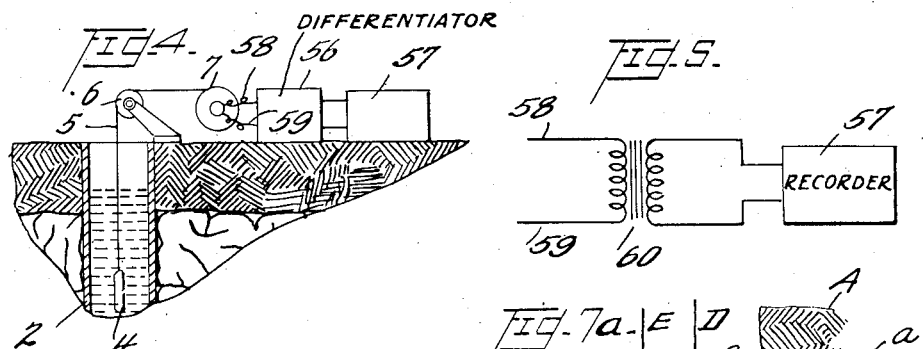
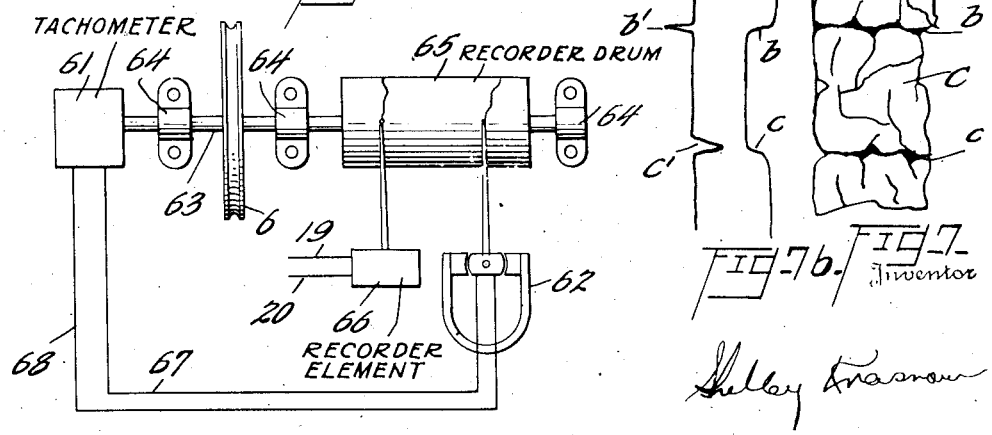
Inventor
Shelley Krasnow

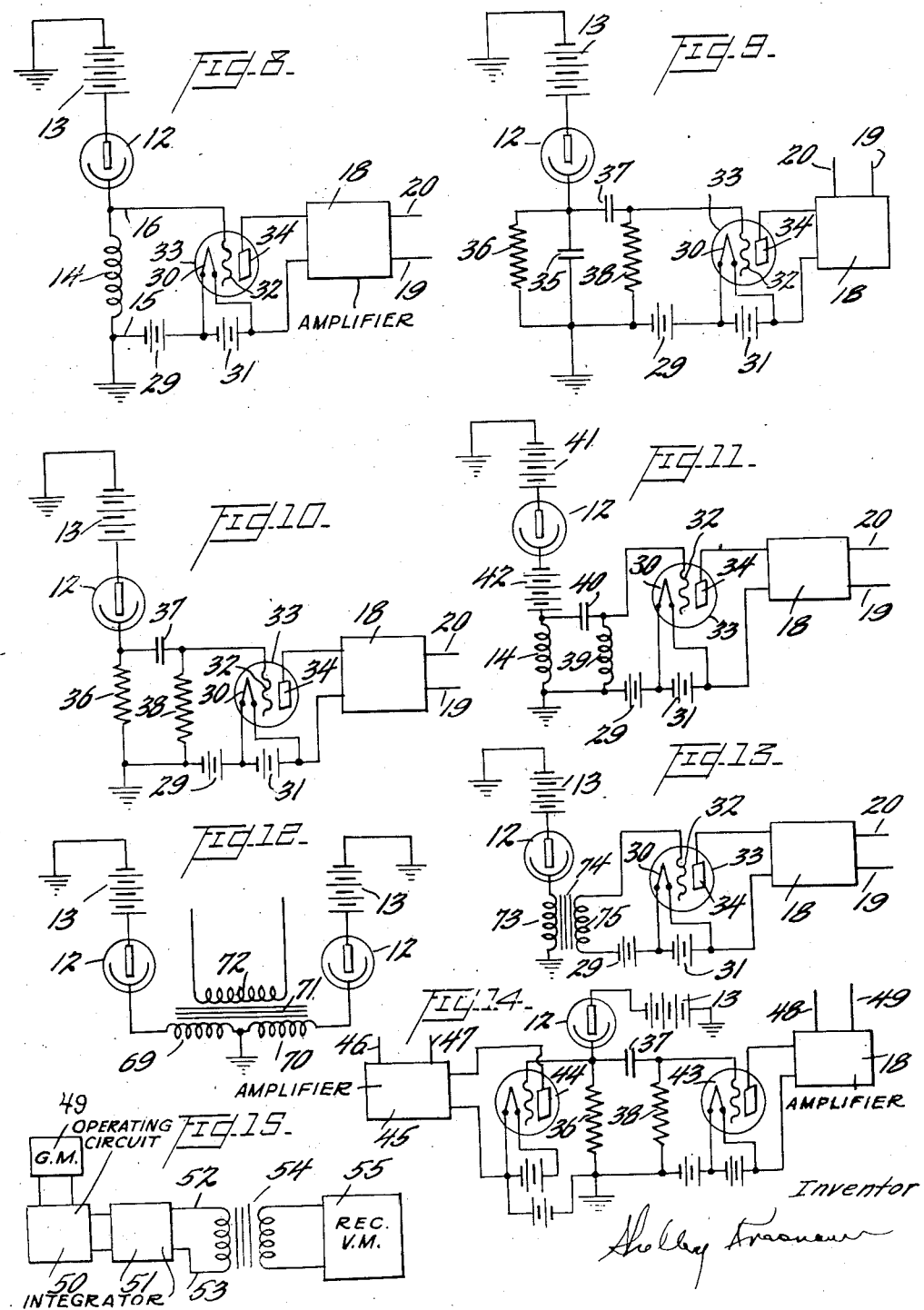

March 20, 1945.   S. KRASNOW   2,371,628
METHOD AND APPARATUS FOR DYNAMIC MEASUREMENT OF BOREHOLE RADIOACTIVITY
Filed Dec. 31, 1940   3 Sheets-Sheet 3
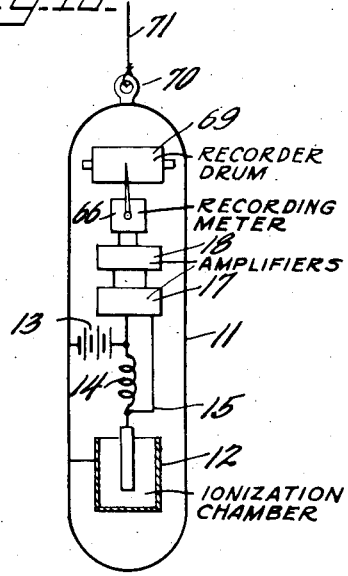
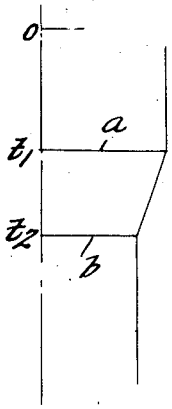
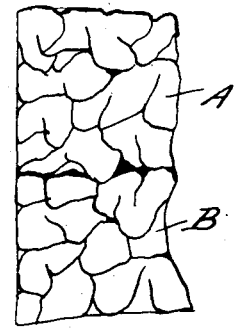
Inventor
Shelley Krasnow Patented Mar. 20, 1945

2,371,628

UNITED STATES PATENT OFFICE 2,371,628

METHOD AND APPARATUS FOR DYNAMIC MEASUREMENT OF BOREHOLE RADIOACTIVITY

Shelley Krasnow, New York, N. Y.

Application December 31, 1940, Serial No. 372,651

24 Claims. (Cl. 250—83.6)

It has previously been shown how to make measurements of radioactive properties at various localities within a borehole. Methods and apparatus were shown for making measurements of radioactive intensity, at for instance, various levels within a borehole, in order to measure the intensity of radiation at each level. The method shown was essentially a "static" one. In other words, the measuring element was allowed to remain at rest at the locality in which measurement was made, or was moved relatively slowly, so that it had ample time to respond, and so that the measurement made in motion was the same as the measurement which would have been obtained were the element at rest. For the rate of motions utilized, no difference in results was observed between measurements taken in motion and at rest, and if the velocity of motion were varied within the range indicated there would be no detectable effect on the measurement.

In the present invention, an entirely novel development is introduced, namely that of obtaining a measurement whose value is related to the speed at which the element is moved within the borehole. This new development is therefore best described as dynamic. With this new system, the greater the speed of movement of the device, the greater the response obtained. At very low rates of speed, and for conditions at rest, no response whatever is obtained. This is in direct contradistinction to the static method which gives its best results when the element is at rest.

Another important difference between the prior art methods and the method of the invention is that the suddenness of change of radioactivity, rather than the actual radioactive intensity is measured. It has been noted that in some cases two strata within a borehole will differ relatively little in their radioactive intensities. At the interface, however, there will be a relatively sudden change. A series of static measurements will give a change which may be rather difficult to deduce from the record. The location of the interface could be deduced with difficulty, if at all. On the contrary, the method of the present invention marks the location of the interfaces very plainly, since a very definite response is obtained where the sudden change in radioactive properties, due to the interface exists.

Another important difference relates to the elimination of spurious effects. In view of the very high sensitivity necessarily utilized to measure the natural radioactivity of rock strata, the apparatus utilized is subject to drift, often of a slow and indefinite character. Thus, in a static measuring system, a slow drift will give the same effect as a gradual increase or decrease of radioactivity, and will be indistinguishable therefrom. A dynamic apparatus, responsive only to relatively sudden changes will ignore such slow drifts entirely.

The essence of the dynamic system involves a time rate of movement of the measuring element relative to the formations to be measured. From this movement is obtained a corresponding time rate of change of response. As a result of the above measurement, with the knowledge of the velocity of motion of the measuring element, values of space rate of change of radioactivity may be obtained. The knowledge of the velocity is not always necessary, however, since if one can determine the location of the detector at the instant when a sudden change in intensity is noted (a high dynamic value), he will know the location of a geologically significant change. It is well to emphasize here that in many cases what is desired is not the actual value of radioactive intensity, since this serves only as a marker to mark the positions of certain strata. The final result desired is the definite location of geologically significant regions. As will be shown below, the dynamic method marks these definitely, and enables the accurate location of them.

The invention also includes the indication of the rate of change in intensity at any instant. This again is in contrast with prior art devices. Thus, with prior art devices, at each instant, the value obtained was of actual intensity. In the present invention the value obtained is rate of change of intensity.

In practice, it is sometimes further desirable to have both dynamic and static records, since each gives a different type of information. By comparing records showing radioactive intensity, and rate of change of radioactive intensity, deductions can be drawn which are often not possible with either record alone. It is further to be noted that what is often of chief interest is the location of the interfaces between strata. It is at these interfaces that sudden changes take place, and such regions are most easily recognized by a rate of change curve. Another way of expressing the difference between dynamic and static measurements is that time enters a parameter in a dynamic measurement, which parameter can afterwards be eliminated by noting the velocity of motion of the measuring element. Thus, a static measuring system might have its speed of lowering altered continuously through the lowering without affecting the measurements, provided that the speed did not exceed a figure determined by the rate of response of the measuring element. On the contrary, a dynamic measurement to be accurate must be made at a speed which is known at all times, since the responses obtained are directly dependent on speed. Still another difference is that the measuring element in a static system will virtually cease to function if it is moved too rapidly since it will not have recovered from a previous measurement before the next succeeding one is to be made. This is very important since often detection of small differences in static measurements are desired. A dynamic system, on the contrary, need not recover entirely. It will mark the location of the place at which sudden change has taken place. Too high a speed may result in the rate of change curve having a different amplitude. However, the localities at which a rapid change has taken place will be clearly marked.

While the specific description given relates to the measurement of natural radioactivity of rock samples, it is understood that it will be equally applicable with rays of any sort having properties similar to or analogous to radioactive rays, whether such rays occur from the natural disintegration of matter or are artificially excited or produced.

It will further be seen that the specific description relates to measurements obtained while the measuring apparatus is lowered into the borehole. The method is equally applicable for measurements made while the instrument is being raised, and in some cases this latter will be more definite due to the more definite control of the velocity of raising as against that obtainable in lowering. The method is equally applicable when applied in sloping or horizontal boreholes, the apparatus being moved in such cases by rigid members or otherwise, as is common in the borehole drilling art.

The above stated characteristics of the present invention clearly mark the objects and advantages of the present invention including methods, systems, and apparatus and mechanisms enabling dynamic measurements of desired parameters to be located, noted, determined, recorded, or otherwise indicated—not alone in boreholes but also for other purposes.

Other objects and advantages will appear from the more detailed description set forth below, it being understood that this more detailed description is given by way of illustration and explanation only, and not by way of limitation, since various changes may be made by those skilled in the art without departing from the scope and spirit of the present invention.

In connection with that more detailed description reference is had to the accompanying drawings in which:

Fig. 1 represents a general view of the apparatus which constitutes the subject of this invention.

Fig. 2 is a schematic view of the measuring element shown in Fig. 1.

Fig. 3 shows still another measuring element which may be used alternatively with that shown in Fig. 2.

Fig. 4 shows a recording and differentiating system.

Fig. 5 shows schematically another differentiating apparatus.

Fig. 6 shows a view of a measuring sheave with associated apparatus.

Fig. 7 shows a series of rock layers with two different kinds of radioactive graphs Figs. 7a and 7b.

Fig. 8 shows a measuring circuit for the apparatus shown in Fig. 2.

Fig. 9 shows another circuit which may be used in place of that shown in Fig. 8.

Fig. 10 shows another circuit which may be used in place of that shown in Fig. 8.

Fig. 11 shows still another circuit which may be used in place of that shown in Fig. 8.

Fig. 12 shows schematically a circuit in which plural elements are utilized.

Fig. 13 shows another modification which may be employed in place of the circuit shown in Fig. 8.

Fig. 14 shows a wiring diagram of an apparatus adapted to be used for static and dynamic measurements.

Fig. 15 shows schematically an alternative system for practicing the method of the invention.

Fig. 16 shows an apparatus for measuring rate of change of radioactivity with the recorder element in the cartridge, and Fig. 17 shows an interface between rock layers, with an associated graph Fig. 17a for calculating the constants of the apparatus.

As thus shown in the drawings, the present invention is particularly concerned with dynamic measurement of various parameters and can well be illustrated by dynamic measurement of radioactivity particularly by means of gamma-rays in boreholes. The apparatus employs a system which is moved rapidly past the material whose radioactivity is to be measured, and as a result of this motion there is obtained a time rate of change of response due to radioactivity, which response can either immediately or later be interpreted as a space rate of change. The apparatus utilized is intended to perform a differentiating operation upon a series of values obtained, each value being representative of radioactive intensity at a locality. The differentiating operation is performed automatically and serves to give a series of rate of change values, these values being indicative of regions where sudden changes in radioactivity have taken place.

Referring to Fig. 1, 1 is a typical rock layer of a series of stratified layers. This is indicated as traversed by a borehole which may or may not be lined with a metallic casing 2. Within the borehole there may or may not be liquid 3. A holder 4 is adapted to be lowered within the borehole and to contain apparatus necessary for responding to the radioactivity of the material within the borehole. Supporting the holder, and serving also to convey the results of measurement to the surface of the ground is a high strength cable 5. This passes over a sheave 6 which serves both to center the cable in the borehole and to indicate the amount of cable that has passed thereover and therefore the depth of cartridge 4. The cable 5 is wound upon a drum 7, which has means for making electrical connection during rotation to cable 5. Attached to such latter means are conductors 8 and 9 passing into a recording element 10.

It will be understood that if the holder 4 is to operate within a liquid-filled hole, it will be encased in a liquid-tight casing and will be suitably weighted so as to sink rapidly within the fluid. This latter condition is particularly desirable in view of the high rates of speed at which the holder 4 may be lowered.

Fig. 2 shows schematically the contents of a holder such as 4. This consists of an outer protecting housing 11 within which is contained, for example, an ionization chamber 12. This ionization chamber may, as illustrated, consist of an inner rod-shaped and an outer hollow-cylindrical-shaped pair of electrodes. A gas is maintained in the space between the electrodes, so that ionization thereof will be detectable by the electric current flowing between the electrodes. Various gases may be utilized, a gas such as nitrogen being suitable. It is desirable to utilize instead of nitrogen or other gases, a gas composed of materials having a high atomic number. This will cause the gas to have a higher stopping power for penetrating rays, and will result in a greater efficiency of the ionization chamber. Examples of such gases are xenon, which has the advantage of being inert and still having a high atomic number. Other possible gases are the fluorides of osmium or bismuth or tungsten. These latter gases may be kept from reacting chemically upon the electrodes by utilizing electrodes made of the same metal as has been used in making the gas. The gas is preferably maintained at a pressure above atmospheric pressure, so as to obtain a heightened ionization effect. The ionization chamber 12 is grounded to the casing 11, which in the instance shown is intended to be of metal. A battery 13 is shown connected through an inductance element 14, and is also grounded to the casing 11. The voltage utilized for the battery should be sufficient to cause a saturation current to flow. It should still be low enough, however, to avoid flashover. The type of gas utilized, the pressure and the battery voltage will be adjusted to each other so as to obtain the best results. By virtue of the connection of the battery 13, inductance 14, and ionization chamber 12, a substantially steady current will flow in the gas in the ionization chamber. The latter will act like a very high resistance whose value is inversely proportional to the radioactive intensity impinging upon the said ionization chamber. The casing 11 of holder 4 is shown in vertical cross-section and it is understood that the ionization chamber desirably is approximately centrally placed symmetrically about a vertical axis, so that rays arising from material within the borehole will impinge radially upon the said ionization chamber. The latter mode of operation is desirable in order to obtain a heightened effect in the measurement of intrinsically weak radioactivity of such material as ordinary rock. The direct current ohmic resistance of the inductance 14 may be made great enough to avoid any possibility of flashover in the ionization chamber. Its principal effect, however, will be due to its inductance, by virtue of which a voltage will be developed between the terminals 15 and 16 whenever any change in current through the ionization chamber takes place.

Connected to terminals 15 and 16 is an amplifier 17 which may be a direct current amplifier. It may alternatively and preferably be an alternating current amplifier of the type usual in the communications arts. This amplifier will be designed to handle effectively the rates of change of applied signal which will be encountered as disclosed herein. In general, the amplifier will be of the audio-frequency type, designed to be most effective and preferably to have approximately linear characteristics for the rates of change encountered as disclosed herein. Below will be given instructions for the determination of the constants of the amplifier. Connected to amplifier 17 is an additional amplifier 18, which serves as what might be termed a power amplifier. This serves to supply enough energy for transmission through a long cable or by other means, and will also include any additional apparatus which may be deemed desirable to facilitate transmission. In the simplest case, the amplifier 18 will be a single vacuum tube, connected in cascade to the amplifier 17 either by resistance coupling, or transformer coupling, or choke coupling, or condenser coupling. If it is thought desirable to send the signal to the surface as a modulated wave, this may be done by a modulator substituted for element 18. It is understood that the necessary batteries for supplying the amplifiers 17 and 18 are contained therein. If amplifier 17 is a direct current amplifier, 18 will preferably be a direct current amplifier. However, an alternating current amplifier may be utilized as element 18 in certain cases in which the rate of change of output of amplifier 17 is sufficient, or where other means are used to obtain the equivalent of a sufficient rate of change of output of amplifier 17. If amplifier 17 is an alternating current amplifier, amplifier 18 may be an alternating current type. In certain cases, however, particularly with small observed rates of change a direct current amplifier may be utilized as amplifier 18, amplifying the output of alternating current amplifier 17. A simple though by no means the only usable amplifier 17 where a direct current type is desired is one employing the vacuum tube designated by the Westinghouse Electric & Mfg. Co. as type RH507. This tube, because of its exceedingly sensitive nature, is subject to various types of disturbances and the instructions indicated in Bulletin TD-507, dated June 12, 1940, of the above-named company must be carefully followed to insure successful results. The literature citations given in the above-identified bulletin indicate the precautions and the specific circuit connections which should be used to obtain successful results with this type of tube. When it is desired to make amplifier 17 an alternating current type, the problem becomes a more simple one, and the precautions taken need not be so elaborate as for the direct current type. Suitable tubes for use as element 17 when it is desired that this element constitute an alternating current amplifier are types 6SF5 and 6SC7 of the Radio Corporation of America. Triodes have been indicated as the tube type in the schematic showings disclosed herein. However, tubes with more than three elements may be substituted for the triodes by methods familiar in the electronic arts.

The means of obtaining amplified responses from the sensitive indicating elements have been indicated briefly above. Other methods will in some cases be found preferable.

Fig. 3 shows an apparatus generally similar to that shown in Fig. 2, provided with means for moving the ionization chamber. This unit has within it an ionization chamber 21 spaced from the walls of cartridge 11 by flexible springs 22. The ionization chamber is thus free to move vertically, with a light spring pressure keeping it centered and in electrical contact with the walls of the metallic cartridge 11. A flexible band 23 is shown wound upon a drum 24 which is fixed upon a shaft of a motor 25. The motor is operated by means of battery 26 through a time switch 27. The switch serves to reverse the motor at intervals. Thus, the cartridge 11 may be maintained at one locality within the borehole, and the ionization chamber moved rapidly within the cartridge 11 to obtain responses as indicated herein. An amplifier 28 is shown schematically as a combination of amplifiers 17 and 18.

Leads 19 and 20 carry the signal to the surface as before.

The circuit shown in Fig. 2 is elaborated in Fig. 8. Here the inductance 14, the ionization chamber 12, and the battery 13 are all shown interconnected as before, except that the inductance 14 has been put in the lead to ground from the ionization chamber 12. This has the advantage of having the entire vacuum tube system near ground potential, which is of aid in avoiding leakage and other difficulties. Attached to terminal 15 of the inductance is a grid biasing battery 29, connected to filament 30 heated by a conventional battery 31. The terminal 16 of the inductance is connected to grid 32 of a vacuum tube 33. It is understood that the amplifier represented schematically in certain views as element 17 will be composed of the vacuum tube 33 with the associated apparatus necessary for operation. The filament 30 and plate 34 are connected to the power amplifier 18. It will be seen that any change in current in inductance 14 will cause an induced voltage between terminals 15 and 16, which being of a varying nature, will be readily amplified by an ordinary vacuum tube 33. The ordinary vacuum tube, as used in the communications arts, can be made to work most effectively with an alternating or varying current. In general, the greater the rate of change, the more easily the conventional vacuum tube can perform its amplifying function. The present invention takes advantage of this property by furnishing to the vacuum tube 33, a varying rather than a substantially constant voltage.

Fig. 9 shows a similar circuit, except that the inductance 14 has been replaced by a condenser 35. This is shunted by a resistor 36 to allow a steady current component to flow through the ionization chamber 12. A blocking condenser 37 is inserted in the grid lead of the tube 33 to filter out the direct current and low frequency components. A resistor 38 and grid biasing battery 29 serve to keep the grid stable and at a desired potential.

Fig. 10 is practically the equivalent of Fig. 9 except that the condenser 35 has been omitted altogether, and the voltage change across resistor 36 only is observed.

Fig. 11 is similar to Fig. 10 except that the resistances 36 and 38 of the latter have been replaced by inductances 14 and 39. A condenser 40 is inserted in the grid lead, the three elements 14, 39 and 40 constituting a tuned circuit. The tuned circuit will accentuate frequencies within a certain range, and will exclude those far above and far below the said range. In practice, the values of capacity and inductance can be so chosen as to pass most readily the rates of change which will be of interest.

Fig. 14 shows a circuit employing an ionization chamber 12 and resistance 36, having a blocking condenser 37 and an alternating current amplifier tube 43. At the same time and across the same resistance 36 there is connected a direct current amplifier tube with its associated circuit shown schematically as 44 and 45. The selection of the proper vacuum tube and associated circuit will be as indicated above in connection with the discussion of the direct current amplifier. The output leads 46 and 47 will therefore give a static measurement, while the output leads 48 and 49 will simultaneously give a dynamic measurement.

Fig. 15 shows schematically an apparatus which will serve the same function as that shown in Fig. 2. Here a Geiger-Müller counter is shown schematically as 72, an operating circuit, shown schematically as 50, and an integrating circuit shown schematically as 51. To the output terminals 52 and 53 of the integrating circuit 51 is connected the primary of a transformer 54. The secondary of the transformer 54 is connected to the terminals of a voltmeter 55 capable of accurately recording alternating current voltages. The elements are shown schematically, and it is understood that they will be mounted in a holder similar to that shown as 11 in Fig. 2. The combination of Geiger-Müller tube with its operating circuit and integrating circuit may be found in the publication by L. F. Curtiss entitled "Detection of radioactive contamination, using Geiger-Müller counters" appearing in Journal of Research of the National Bureau of Standards, vol. 23, July, 1939, pages 137-143 inclusive. This reference describes a typical circuit, though any other circuit furnishing an output proportional to radioactive properties may be substituted.

If reference is had to the above-identified article, particularly to the wiring diagram appearing on page 139 thereof, it will be noted that there is a Geiger-Müller tube identified in Figure 3 on this page as "G-M." This corresponds to element 72 in Figure 15 of the drawings. There will then be seen the tubes identified by the numbers 57, 57, in the figure shown in the article. These constitute an operating circuit, shown schematically in Figure 15 in the drawings of the instant case as element 50. It will then be seen that there are tubes identified by numbers 27 and 56 in the figure shown in the article. These and their associated elements constitute an integrating circuit, shown schematically in the drawings in the instant case as element 51. It will be noted that the output of the integrating circuit shown in the article is a direct current, which in the specific case shown is capable of operating the direct-current indicating meter M. It is this direct current which is used across the terminals 52—53 of the transformer 54 disclosed herein.

It will be obvious from the above that the current flow through the terminals 52—53 will be proportional to the rate of production of pulses in the Geiger-Müller counter. Each change in this rate of production will produce a consequent change in current. The transformer will, by the well-known property of a transformer, give at its secondary terminals the rate of change of current flowing through the primary thereof, and since the current flowing through the primary is proportional to the rate of production of pulses the voltage at the secondary terminals will be proportional to the rate of change of rate of production or frequency of pulses.

Fig. 16 shows a recorder system, completely enclosed within the metallic holder 11. This apparatus is substantially the equal of that shown in Fig. 2, except that amplifier 18 feeds directly into a recording electric meter represented schematically as 66. This records upon a recorder drum 69, which is driven by a clockwork mechanism by methods familiar in the recording electric meter art. A loop 70, fastened to the top of cartridge 11, has fastened to it a strong cable or rope 71, which is wound in a manner similar to that indicated in Fig. 1, except that no electrical contacts need be made to the cable. However, it is desirable, and in some cases will prove necessary to record the speed of lowering. This may be done by the apparatus shown in Fig. 6.

Since the element 66 within the cartridge 11 in Fig. 16 serves the function of similar element 66 in Fig. 6 the latter element 66 will not have to be used.

Attention is now directed to a typical circuit such as that shown in Fig. 8. The ionization chamber 12 constitutes a circuit element in the series circuit composed of battery 13, the ionization chamber 12, and inductance 14. With a constant radioactivity, and therefore a constant ionization in the ionization chamber, a practically steady current will flow through the entire circuit and therefore through inductance 14. Since the inductance 14 has been chosen to have a low direct current resistance, the voltage developed across terminals 15 and 16 will be very small, and will leave vacuum tube 33 virtually unaffected. However, should the radioactivity in the vicinity of ionization chamber 12 change, the current in inductance 14 will change correspondingly. By virtue of this change, a voltage will be developed across terminals 15 and 16, and as is well known in the electrical art, this voltage will be proportional to the rate of change. This voltage may be many times as great as that due to the direct current resistance drop of the inductance 14. Since the voltage is a changing one, it will be amplified much more readily by a conventional vacuum tube. It is therefore seen, that a dynamic measurement is obtained, one which is dependent on the change in radioactive quantity, rather than in the quantity itself. Thus, the element 4 in Fig. 1 might be moved rapidly past the various interfaces shown and at each interface where a sudden change in radioactivity occurred, there would be a sudden change in current flowing through inductance 14. This would be recognized readily by the development of a sudden relatively high voltage across inductance 14. If this value is observed simultaneously with the value of depth indicated by sheave 6, the location of the interface will be accurately indicated.

It is to be noted that the voltage developed between terminals 15 and 16 will be of a small value if the rate of change of current flowing therethrough is small. Systems employing an ionization chamber in series with a source of voltage and a simple resistance, unless very carefully designed, are particularly susceptible to slow drifts, due to slowly changing battery voltage, slow insulation leaks, thermal effects, etc. These slow drifts would alter the actual value of the current flowing through the series circuit, but will have practically no effect on the voltage developed across an inductance such as 14.

It will be understood that because of the small currents ordinarily flowing through an ionization chamber such as 12, the inductance 14 will have to have a rather high value. Thus, it should preferably be constructed with a great number of turns of fine wire, the wire used being such that it will have as high a conductivity as possible. A typical satisfactory wire would be one of oxygen-free high conductivity copper, covered with enamel insulation. Silver wire may be utilized with a gain in performance. The core should preferably be one made up of closed members, with no leakage gap and should preferably be made of some material such as "Permalloy" so as to involve a minimum loss due to hysteresis. The vacuum tube utilized as 33 will be chosen according to the values of voltage, and the other circuit constants. The power amplifier 18 serves to amplify the currents from the vacuum tube 33, and make them more suitable for transmission. The required amplification for this purpose can usually not be obtained from tube 33 alone, although in some cases the leads from plate 34 and filament 30 might be taken directly to the surface of the earth. It will be understood that the amplifier 18 can be an alternating current type, since changing currents will be found in the output of tube 33 due to the changing voltage across the grid and filament of the tube.

The circuit shown in Fig. 9 employs a condenser 35 across which a voltage is developed by virtue of any changing current which flows through ionization chamber 12. The resistor 36 serves to allow sufficient current to flow when there is no change, so that the ionization chamber may function in the usual and normal way. However, the condenser will be particularly responsive to sudden changes, and will serve to emphasize such changes. The resistor 36 should be as high a value as is consistent with the stability of the ionization chamber. Blocking condenser 37 is intended to block any direct current component. It will therefore cause the grid of the vacuum tube to receive only changing voltages across condenser 35. The system will therefore respond only to changing radioactivity, and its performance will be similar to that indicated for Fig. 8.

In Fig. 10, the condenser has been removed, but the blocking condenser 37 still retained. The performance of this circuit will be similar to, though not so effective as that of the circuit shown in Fig. 8 and Fig. 9. Fig. 11 shows a circuit which is especially responsive to a limited band of frequencies. Inductances 14 and 39 and condenser 40 constitute a resonant circuit which will impress frequencies within a certain band upon vacuum tube 33, but will discriminate against frequencies which are far above or far below the selected band. Thus, very slow drifts, due to causes enumerated above, and exceptionally sudden changes, due to shifting of connections will be excluded. It will be known in advance that responses of only a certain suddenness can be expected, and any change more sudden than this will be due to spurious causes. In the same way, changes below a certain suddenness are of no interest, and these together with slow spurious effects will be eliminated. With a given speed of lowering, it will be known that it is impossible for a rate of change greater than a certain figure to be observed. Geological considerations may also show that the rate of change cannot be more than a certain figure. It is desirable to exclude all changes of greater suddenness than the greatest possible one, since such changes can be due only to spurious effects. Similarly, slow changes are not of interest, since they are usually the slight changes within a single layer. They can therefore be excluded with advantage, since their exclusion also automatically excludes effects due to drift in the apparatus, and to other disturbances which are in no way related to the phenomena under observation. Another difference which may be noted in Fig. 11, and which may be applied to any of the other circuits shown is that a battery similar to 13 has been divided into two parts, 41 and 42, each having half the voltage to battery 13 of Figs. 8–10. The advantage of this system is that no part of the ionization chamber is more than one-half total voltage above ground. This will reduce leakage difficulties. However, a single battery such as 13 of Fig. 8 or 10 may be successfully used in place of batteries 41 and 42 in Fig. 11.

Fig. 13 shows a circuit similar to that shown in Fig. 8, except that instead of direct coupling the grid 32 and filament 30 to an inductance, a transformer 74 is used. It will be understood that the same precautions will be necessary in building this transformer as indicated for the inductance 14 of Fig. 8. In addition, the secondary 75 should preferably have its impedance matched to the input impedance of the tube 33.

Fig. 12 shows plural elements, each corresponding to the series circuit shown in Fig. 13. A single secondary 72, takes the place of secondary 75 in Fig. 13. The plural elements 12, 12 may be mounted for instance one above the other in a cartridge such as 4 of Fig. 2 and will serve to give a combined result in the secondary 72. The advantage of using plural elements, and the specific mode of their use has been indicated.

In some cases, it is found desirable to obtain both intensity and rate of change measurements; in other words, both static and dynamic measurements. The system shown in Fig. 14 gives both responses simultaneously utilizing a single ionization chamber 12 and single resistor 36. The advantage of using the same elements for both circuits is that the responses of each type are directly comparable, having been obtained with the same measuring elements. Were separate elements to be used, there would be some doubt as to the exact correlation of the static and dynamic measurements. This point can hardly be overemphasized, and is of extreme importance in the making of these measurements. The quantities, radioactive intensity and radioactive rate of change are sometimes exceedingly small. The slightest difference in the performance of the circuit elements may make a considerable difference in the exact result obtained. As indicated above, by the use of certain elements common to the individual systems, results are obtained which are comparable beyond any doubt. The operation of the circuit will be obvious from the previous discussions.

In certain instances, such as are concerned with the portions near the very bottom of a borehole, it may not be possible to move the entire cartridge 4 very rapidly. In such cases, the apparatus shown in Fig. 3 allows the ionization chamber element to be moved rapidly while the outer cartridge 11 is at rest. The type of result obtained will be similar to that indicated for a rapid movement of cartridge 4.

A consideration of the system described will reveal that what is done in effect is to obtain a response which depends upon the intensity of radioactivity, and to differentiate this response so as to obtain a new series of relations, which depend upon rate of change rather than actual intensity. Thus an inductance such as 14 performs a differentiating operation upon the current flowing through ionization chamber 12. The voltage induced across the terminals 15 and 16 is a measure of the first derivative of this current. Since the vacuum tube amplifies, and the rest of the system records this voltage, what is obtained is really a result proportional to the first derivative of the intensities as one proceeds down the borehole. Using the common expression $$E = -L \frac{di}{dt}$$

where L is the inductance, $i$ is the current flowing therethrough, E is the induced voltage, and $t$ the time, it is plainly seen that the inductance 14 really serves as an automatic differentiating mechanism. This differentiation is most conveniently performed in the borehole but need not be as indicated by Fig. 4. In this case, a radioactive intensity measuring system can be utilized, lowered into the borehole and furnishing at the end of a cable at the surface of the ground, an output proportional to the radioactive intensity at a depth. The sort of response obtained will be similar to that obtained from the left hand portion of Fig. 14, the terminals 46 and 47 in this showing supplying an output proportional to radioactive intensity. Such an output would be brought up cable 5, would be conducted by means of connections 58 and 59 to an automatic differentiating mechanism 56. The output of this is fed into a recorder 57, which serves to record a series of first derivatives of the values coming up cable 5. Although several possible arrangements may be used, one is shown in Fig. 5. Here the input current, proportional to the intensity, is fed into terminals 58 and 59. As is well known, the voltage developed across the secondary of a transformer is proportional to the time rate of change of current through the primary. In this way, a transformer can be used as means for differentiating. Transformer 60 will have across its secondary as a consequence, a voltage proportional to the first derivative of the current flowing through the primary. Leads proceed from the secondary to a recording mechanism shown schematically as 57. This recording mechanism may be any suitable electrical recording meter, making a record on a chart. In the present specific instance, 57 would be a recording alternating current voltmeter, of a type drawing a small current from its input.

In the previous discussion, only an ionization chamber has been mentioned. However, any measuring system which gives a result capable of having a differentiating operation performed upon it may be used. A typical alternative application is shown in Fig. 15. Here 49 represents a Geiger-Müller counter, 50 an operating circuit, an electrical system adapted to give uniform pulses for each count of the Geiger-Müller tube, and 51 an integrator, which serves to smooth or integrate the pulses. The output of this passes through leads 52 and 53 into the primary of transformer 54. For any change in radioactivity, there will be a corresponding change in current flowing through the primary of the transformer, and there will be induced in the secondary a voltage whose value is proportional to the rate of change of the current. This voltage can be measured by any suitable alternating current voltmeter. It is thus seen, that such a voltage will be indicative of the suddenness of change of radioactivity as one proceeds along the borehole.

Since the response obtained in a dynamic or rate of change measurement depends upon the velocity of motion of an element such as 4, for an accurate evaluation of the results of such measurement, it is necessary to know the velocity with which the cartridge is lowered. Fig. 6 shows a suitable system for obtaining the velocity. Here a grooved measuring sheave 6, with accurately known circumference rotates a recorder drum 65. The drum 65 and sheave 6 are rigidly fastened to shaft 63 which rotates in bearings 64, 64, 64. The position of the drum is therefore a measure of the length of cable which has passed over the drum, therefore the depth of the cartridge 4. It is understood that the coupling need not literally be direct, that there may be some intermediate connection such as a "Selsyn" motor system, or some suitable substitute to give a motion of the recorder drum 65 proportional to the motion of pulley 6. Attached to shaft 63 is an electric tachometer 61, such as type 724 or 44 manufactured by the Weston Electrical Instrument Corp. This gives a direct current voltage proportional to the speed of rotation. By means of a recording direct current voltmeter, connected to tachometer 61 and recording upon drum 65, a measure of the velocity at any instant is obtained. At the same time, the rate of change record is made on the same drum through recorder element 66. Thus, one can know simultaneously, position of the cartridge, speed of the cartridge, and time rate of change of radioactivity.

It will be observed throughout this discussion that the results obtained by a dynamic measurement as described herein are dependent upon time; in other words, by the rate at which the cartridge is moved past the formations. This feature is one of the most conspicuous of the dynamic measurement. For certain purposes it is only necessary to know where the cartridge was, when a sudden change was observed. In other cases, where more refined information is required, it is desirable to know quantitatively how rapidly the radioactivity has changed. The latter involves a knowledge of the velocity of motion of the cartridge, and if this is known, the rate at which radioactivity changes with depth, or in other words with space, can be determined.

For a constant speed of motion of the cartridge the space rate of change of radioactivity, or rate of change with depth, can be determined from the time rate of change data by dividing this time rate by the velocity. For a varying velocity, one can use the relation that the space rate of change will be proportional to $$\frac{di}{ds} = \frac{di}{dt} \cdot \frac{dt}{ds}$$

The first value, $$\frac{di}{dt}$$

will be the time rate of change of radioactivity, and $$\frac{dt}{ds}$$

will be one over the instantaneous velocity.

Fig. 7 shows three typical rock layers A, B and C with respective interfaces, $a$, $b$ and $c$. Curve D represents the ordinary curve of radioactivity. By inspecting this, it is seen that changes take place chiefly at the interfaces shown as $a$, $b$ and $c$. Curve E is a dynamic curve obtained from systems such as described herein. Here it will be noted that there is a very sharp indication at each interface where a sudden change of radioactivity takes place. It will be noted that the magnitude of the change is of little moment, since the peak of each curve indicates definitely the location of the interface. It will also be noted that the interfaces are found more easily with a curve such as E than with one such as C. Although depth has been used as the example here, it is well to state that some boreholes are horizontal and that a cartridge can be drawn out rapidly still obtaining the desired results. Here it is position rather than depth which is recorded by a measuring wheel such as 6.

Fig. 17 has been included to show the method of designing the apparatus and the selection of the circuit constants thereof. Let A and B be two strata of different geological character, having different associated radioactivities. Let a radioactive measuring unit be lowered uniformly starting with point O. Up to time $t_1$ the value of the radioactive intensity will be $a$. It will then change so as to become the value $b$ at time $t_2$. The time rate of change of radioactivity for this case will be the total change divided by the time interval in which the change has taken place. Expressed algebraically, the rate of change will be equal to $$\frac{a-b}{t_2-t_1}$$

From this figure, knowing the properties of for instance a specific ionization chamber, one can tell the rate of change of current which will flow through the ionization chamber. This may be designated by $$\frac{di}{dt}$$

One can now select a vacuum tube, and determine the voltage which can be significantly amplified by this tube. If this voltage is $E_1$, then the value of an inductance such as 14 will have to be such that $E_1$ will equal $$-L_1 \cdot \frac{di}{dt}$$

It will then be known that the inductance must have the value $L_1$. It is therefore seen how with a specific ionization chamber or similar equivalent radioactive measuring element, a specific vacuum tube or equivalent amplifier element, knowing the rate of change of radioactivity which will be obtained for a typical borehole condition, one can determine the circuit constants of the rate of change measuring system. Where the value of any one of the elements, such as for instance the inductance L is limited by space or other considerations, it is understood that the properties of the other elements may be modified so as to obtain the same relationship:

$$E_1 = -L_1 \cdot \frac{di}{dt}$$

The values of elements such as for example condenser 37, condenser 35, resistance 38, inductance 39 and condenser 40, may be determined in a similar fashion.

In certain cases, the rate of change value obtainable on account of inherent limitations may be so low that an inductance or equivalent capacitance to give a significant rate of change measurement would be prohibitively large, and would be incapable of fitting into a cartridge to be inserted into the limited lateral space available in a borehole. In such cases, the inductance can be made very large, if necessary, and can be mounted at the surface of the ground. The system shown in Fig. 4 would be applicable here, and the inductance for example might be utilized as element 56.

Although the above disclosure has been concerned chiefly with the measurement of natural radioactivity of rock strata in a borehole, it is understood that it will detect with equal effectiveness artificially placed radioactive materials, or concentrations of radioactive materials. It is possible to introduce radioactive material within a borehole and to afterwards detect the presence of this radioactive material. The present system will operate very efficiently for such cases.

The above description has shown how to obtain rate of change values where the change is due to the motion of the measuring element. Any other system which causes a change in the number of rays impinging upon an element will operate with equal effectiveness. What is important is that there be a significant time rate of change of received rays. The systems described will operate successfully under such conditions, whatever the cause of the changing number of rays.

The scope of the invention is indicated by the appended claims.

I claim:

1. In an apparatus for obtaining information concerning conditions within a borehole, means insertable within the borehole, and responsive to radioactive rays originating within the borehole, means to measure the time derivative of response of the first named means, means at the surface of the earth to record the said time derivative, and means to indicate the position of the first named means, the said indicated time derivative and indicated position serving to enable the correlation between radioactive properties and position within the borehole.

2. In an apparatus for obtaining information concerning conditions in a borehole, a detector responsive to radioactive rays originating from material within the borehole, means to position the said detector at a desired locality within the borehole, means to obtain a response indicative of the radioactivity received by the detector, means for obtaining a time derivative of the said response, and means positioned at the surface of the earth for recording the said derivative, thereby obtaining a series of values of time derivative, the said values of time derivative being indicative of conditions within the borehole.

3. In an apparatus for identifying strata within a deep narrow borehole, a member sensitive to radioactivity, and adapted to be moved within the borehole, means to move the said member rapidly relative to material within the borehole, means to measure the time derivative of response of the said member, as related to the speed of movement thereof, and means for indicating the position of the said member, the said assemblage making possible the correlation of time derivative values with depth, thereby enabling the location of regions in which sudden changes in radioactivity have taken place.

4. In an apparatus for measuring radioactivity within a deep narrow borehole, a system adapted to be inserted within the borehole, and to give a response proportional to radioactive intensity, differentiating means connected to the output of the said system, so as to obtain the time rate of change of radioactivity, recording means at the surface of the earth connected to the output of the said differentiating means, and serving to record at the surface of the earth the time derivative of the radioactive intensity, the said recorded time derivative values being correlatable each with the localities of the system within the borehole, thereby indicating marked changes in radioactivity within the said borehole.

5. In an apparatus for measuring radioactive quantities within a deep narrow borehole, a member responsive to radioactivity, means serving to move the said member rapidly relative to the material within the borehole, thereby obtaining a significant time derivative of output of the said member, means to indicate the said time derivative, means to record the velocity of motion of the said member, and means to indicate the position of the said member, the said indicated values making possible by their intercomparison the location of regions in which there is a sudden change of radioactivity.

6. In an apparatus for measuring radioactivity within a deep narrow borehole, a measuring system adapted to give a series of impulses whose frequency is related to the intensity of radioactivity within the borehole, means for smoothing the said pulses so as to obtain an average rate, and means to record the time derivative of the frequency of production of the said pulses, the said recorded time derivative serving to accentuate the response due to a sudden change in radioactivity.

7. In an apparatus for measuring radioactivity within a borehole, an electrical system including a member sensitive to radioactivity and insertable within the borehole, the voltage developed within a part of the said system being related to the radioactivity measured by the sensitive member, a filter system connected to the first-named system, serving to allow only certain frequencies to pass, thereby allowing a measurement to be made of the rate of change of radioactivity within a limited frequency change, thereby eliminating the effect of drift and other spurious phenomena.

8. In an apparatus for measuring radioactivity within a borehole, in which a member sensitive to radioactivity responsive in a predetermined manner to the rate of motion in passing strata of different radioactivity is lowered within the borehole, a cable connected to the said member, serving to position the said member within the borehole, measuring means associated with the said cable, adapted to measure the length of cable passing thereover, so as to obtain a measure of the position of the said radioactive member, velocity measuring means associated with the first-named measuring means and adapted to indicate the velocity of motion of the cable at any instant, and indicating means serving to indicate substantially simultaneously position, velocity, and response of the said radioactive measuring member, the said indicated quantities making possible by their comparison the interpretation of measurements of radioactivity within the borehole.

9. In a method of measuring radioactive properties within a deep narrow borehole, the steps of generating a series of pulses whose frequency is related to the intensity of the radioactivity within the borehole, the said frequency therefore being a measure of the radioactive intensity within the borehole, of measuring the time rate of change of production of the pulses thereby obtaining the time rate of change of radioactivity within the borehole, the said time rate of change furnishing information concerning differences in radioactivity within the borehole.

10. In a method of identifying strata within a borehole, in which a detectable change in radioactive intensity exists between adjacent strata, the steps of rapidly moving a member sensitive to radioactivity past said strata, of measuring the time derivative of response of the sensitive member, of substantially simultaneously noting the position of the detector when the said time derivative was obtained, thereby enabling the detection of regions in which marked changes of radioactivity have taken place.

11. In a method of measuring radioactivity in a borehole, the steps of altering the number of rays impinging upon a sensitive member, the said alteration being performed at a known and definite time rate, of obtaining from the said alteration a response whose time derivative is related to the time rate of alteration of the said rays, the said alteration and the said receiving of the rays being performed within the borehole, of transmitting the indication of the said derivative to the surface of the earth and there recording it in correlation with the rate of alteration of the rays impinging upon the sensitive member, serving to eliminate spurious effects and to accentuate sudden changes in radioactivity in the borehole.

12. In a method of obtaining information concerning conditions existing within a deep narrow borehole, the steps of rapidly moving a member associated with a radioactive measuring system, so as to expose the said member in sequence to different numbers of incident rays, thereby obtaining a rapid change in the number of rays reaching the said member, of developing in the said measuring system a changing response, directly related to the change in the number of rays reaching the said member, of measuring the instantaneous time derivative of response, of transmitting the indication of the said time derivative to the surface of the earth, thereby furnishing information delineating regions of sudden radioactive changes within the borehole.

13. In a method of obtaining information concerning radioactivity within a deep narrow borehole, the steps of obtaining a series of values each giving the relation between radioactivity within the borehole and position within the borehole, the said series of values constituting a function, of substantially simultaneously and automatically performing a differentiating operation upon the said function, thereby obtaining a new series of values, of recording solely the said new series of values in correlation with the values of positions at which each of the measurements was obtained, serving to accentuate sudden changes in radioactivity.

14. In a method of making radioactive measurements within a deep narrow borehole, the steps of causing a substantially continuous current to flow in an electrical system, of altering the conducting properties of one of the components of the said system in proportion to the radioactive intensities in the vicinity of the said component within the borehole, thereby obtaining for an altered value of radioactivity an altered and corresponding current flow in the said system, of generating a voltage in an additional component of the circuit, the said voltage being proportional to the time derivative of current flow through the said circuit, of measuring the said voltage, thereby obtaining a measure of the rate of change of the number of rays impinging upon the first named component and of recording at the surface of the earth the said voltage in correlation with the position of the first-named component, thereby serving to give information concerning changes of radioactivity within the borehole.

15. In a method of measuring radioactive properties within a borehole, the steps of altering the number of rays within the borehole which impinge upon an element of an electrical system, of impressing a voltage across the said element, of causing a flow of current whose value is related directly to the radioactive intensity, of generating a voltage whose value is related to the time derivative of the said current, of recording at the surface of the earth the said voltage in correlation with the position of the said element, thereby obtaining a measure of the time rate of change of the radioactivity as related to the position within the borehole.

16. In a method of obtaining information concerning radioactivity within a deep narrow borehole, the steps of obtaining a series of values each giving the relation between radioactivity within the borehole and position within the borehole, the said series of values constituting a function, of performing a differentiating operation upon the said function, thereby obtaining a new series of values, of recording at the surface of the earth the said new series of values and substantially simultaneously recording a series of values of positions at which each of the measurements was obtained, the said new series of values being correlatable with the respective positions, serving further to accentuate sudden changes in radioactivity.

17. In an apparatus for measuring radioactive properties within a borehole in which a radioactive apparatus whose response is dependent upon the velocity of motion thereof is lowered into the borehole, the said apparatus including a detector responsive to radioactive rays received in the borehole, means to lower and raise the detector within the borehole, additional means coacting with the said means to indicate the velocity of motion of the detector within the borehole, and means to indicate simultaneously a radioactive property and the velocity of motion at the time the radioactive property was measured, the last-named means being connected to the radioactive detector and to the velocity measuring means so as to be responsive thereto.

18. In an apparatus for measurement of physical properties within a borehole in which an element whose response is determined by the velocity of motion thereof is lowered within an opening in the earth to measure physical properties therein, a measuring sheave adapted to have a suspending cable pass thereover said cable carrying a member for measuring a physical quantity, means attached to the sheave to move a recording chart, additional means connected to the said sheave responsive to the velocity thereof, recording means to indicate the velocity indicated by the said additional means, and recording means to indicate the output of the measuring member, the aforesaid combination of elements serving to provide a readily comparable record correlating position, physical quantity and velocity within the borehole.

19. In a method for the measurement of physical properties within a borehole in which a measuring apparatus is utilized whose response is conditioned by the velocity of motion thereof, the steps of lowering the said apparatus into the borehole to respond to a physical quantity therein, of recording at all times the position of the said apparatus, and of simultaneously recording in correlation with position the output of the said apparatus and the velocity of motion thereof, thereby providing a record permitting comparison of the indicated physical quantity, position, and velocity of motion within the borehole.

20. In an apparatus for the measurement of physical properties within a borehole, means responsive to a physical quantity in the borehole and to the velocity with which the said means is lowered within the borehole, means for lowering said responsive means in said borehole, means for recording at all times the position of said responsive means, and means for simultaneously recording in correlation with position the output of said responsive means and the velocity of motion thereof, thereby providing a record permitting comparison of the indicated physical quantity, position, and velocity of motion within the borehole.

21. In an apparatus for the measurement of physical quantities within a borehole in which a measuring element whose response is proportional to the velocity of motion within the borehole is lowered therein, a measuring sheave adapted to have a cable for raising and lowering the said element to be lowered into the borehole pass thereover a recorder element adapted to operate in combination with the said sheave, and to move proportionally with the movement of the said sheave, a velocity indicating element attached to the said sheave, and adapted to indicate the velocity of rotation thereof, means to provide a permanent record derived from the velocity measuring means upon the said recorder element, and means to provide a comparable record of the physical quantity being measured by the element lowered within the said borehole.

22. In an apparatus for the measurement of a physical quantity within a borehole, a measuring instrument adapted to be lowered within the borehole, and to transmit to the surface of the earth responses indicative of the quantity being measured, a differentiating means at the surface of the earth connected to the output of the said measuring instrument and adapted to perform a differentiating operation upon the said responses, and a recorder operable from the output of the differentiating means to record the differentiated values.

23. In an apparatus for the measurement of radioactivity within a borehole, a long narrow holder adapted to be lowered to various depths within the borehole, a measuring element contained within the holder, responsive to the time derivative of radioactive intensity impinging thereon, a unit entirely contained within the said holder to move the said measuring element longitudinally relative to the holder, whereby by the effect of the motion on the said measuring element past the strata within the borehole marked changes in radioactivity may be accentuated.

24. In an apparatus for measuring radioactive intensity within a borehole, a radioactive measuring system whose response in passing formations of different radioactivity does not increase with increase in velocity of motion relative to these formations over a predetermined range of rate of motion, a dynamic measuring system whose response in passing formations of different radioactivity increases with rate of motion over the same predetermined range of rate of motion, the said measuring systems being mounted adjacent each other so that they may be moved simultaneously within the borehole, communicating means serving to convey the respective measurements separately to the surface of the earth, means to indicate the said respective measurements individually, and means to indicate the location of the said systems, thereby furnishing a record of two different radioactive values, facilitating by their intercomparison the discovery of changes in radioactivity.

SHELLEY KRASNOW.